United States Patent
Takeuchi

(10) Patent No.: US 10,321,043 B2
(45) Date of Patent: Jun. 11, 2019

(54) FOCUS DETECTION APPARATUS, FOCUS CONTROL APPARATUS, IMAGE-CAPTURING APPARATUS AND FOCUS DETECTION METHOD

(71) Applicant: CANON KABUSHIKI KAISHA, Tokyo (JP)

(72) Inventor: Kengo Takeuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 15/617,255

(22) Filed: Jun. 8, 2017

(65) Prior Publication Data

US 2017/0366736 A1  Dec. 21, 2017

(30) Foreign Application Priority Data

Jun. 15, 2016  (JP) .................................. 2016-119197

(51) Int. Cl.
*H04N 5/232* (2006.01)
*G03B 13/36* (2006.01)

(52) U.S. Cl.
CPC ......... *H04N 5/23212* (2013.01); *G03B 13/36* (2013.01)

(58) Field of Classification Search
CPC .... G03B 13/36; G03B 13/20; H04N 5/23212; H04N 5/2353; H04N 5/351; H04N 5/357; H04N 13/0207; G02B 7/34–346
USPC .................. 348/46, 294, 241, 296, 345–357; 396/128, 114; 356/3.13
See application file for complete search history.

(56) References Cited

U.S. PATENT DOCUMENTS

| | | | | |
|---|---|---|---|---|
| 2005/0185086 A1* | 8/2005 | Onozawa | ........... | H04N 5/23212 348/349 |
| 2010/0124413 A1* | 5/2010 | Moon | ...................... | G02B 7/08 396/117 |
| 2014/0285627 A1* | 9/2014 | Kuboi | .................. | H04N 5/2353 348/46 |
| 2016/0301853 A1 | 10/2016 | Takeuchi | | |
| 2017/0237895 A1* | 8/2017 | Sakurabu | ................. | G02B 7/34 348/353 |

FOREIGN PATENT DOCUMENTS

| | | |
|---|---|---|
| EP | 387088 A2 | 3/1990 |
| JP | 2969642 B2 | 11/1999 |

* cited by examiner

*Primary Examiner* — Xi Wang

(74) *Attorney, Agent, or Firm* — Venable LLP

(57) ABSTRACT

The focus detection apparatus includes circuitry which function as a producer configured to acquire paired phase difference image signals that are produced through photoelectric conversion of an object image formed by an optical system including a focus lens and that have therebetween a phase difference corresponding to a focus state of the object image, and configured to produce focus detection information using the phase difference acquired from the paired phase difference image signals, and an acquirer configured to acquire a feature value relating to a correlation value between the paired phase difference image signals. The producer is configured to acquire the phase difference depending on a result of comparison between the feature values acquired before and after driving of the focus lens.

16 Claims, 15 Drawing Sheets

CORRELATION FEATURE VALUE

|  | S1 | S2 | S3 | S4 |
|---|---|---|---|---|
| SHIFT AMOUNT S | -33.3 | -15.2 | +3.5 | +22 |
| INTERVAL |  | 18.1 | 18.7 | 18.5 |
| CENTRAL VALUE 0 | -24.25 | -5.85 | 12.75 |  |

|  | S1 | S2 | S3 | S4 |
|---|---|---|---|---|
| SHIFT AMOUNT | -33.3 | -15.2 | +3.5 | +22 |
| DEFOCUS AMOUNT [mm] | -9.99 | -4.56 | +1.05 | +6.6 |
| PROBABILITY FROM LENS STATUS | × | ◎ | ◎ | ◎ |
| PROBABILITY FROM CONTRAS VALUE | × | ○ | ◎ | △ |

$T_0$

| | S1 | S2 | S3 | S4 |
|---|---|---|---|---|
| SHIFT AMOUNT S | −33.3 | −15.2 | +3.5 | +22 |
| INTERVAL W | 18.1 | 18.7 | 18.5 | |
| CENTRAL VALUE O | −24.25 | −5.85 | 12.75 | |

FIG. 16A $T_1$

| | S1 | S2 | S3 | S4 |
|---|---|---|---|---|
| SHIFT AMOUNT S | −36.4 | −18.4 | +0 | +18.2 |
| INTERVAL W | 18.0 | 18.4 | 18.2 | |
| CENTRAL VALUE O | −27.4 | −9.25 | 9.1 | |

FIG. 16B

FOCUS DETECTION APPARATUS, FOCUS CONTROL APPARATUS, IMAGE-CAPTURING APPARATUS AND FOCUS DETECTION METHOD

BACKGROUND OF THE INVENTION

Field of the Invention

The present invention relates to focus detection performed in image-capturing apparatuses such as digital cameras and video cameras, and particularly to focus detection performed by a phase difference detection method.

Description of the Related Art

Focus detection methods for detecting a focus state of an imaging optical system (or an object image) include a phase difference detection method. The phase difference detection method causes paired photoelectric converters to photoelectrically convert paired object images formed by dividing a pupil of the imaging optical system, and performs a correlation calculation on paired phase difference image signals acquired from the paired photoelectric converters to calculate a phase difference that indicates the focus state of the imaging optical system. However, the phase difference detection method is likely to decrease focus detection accuracy for an object having a periodic contrast (in other words, a repetitive pattern).

Japanese Patent No. 2969642 discloses a focus detection apparatus that determines, when a correlation value acquired by a correlation calculation has periodic local minimal values, that an object has a periodic contrast to provide a warning to a user. The focus detection apparatus disclosed in Japanese Patent No. 2969642 is capable of avoiding malfunction thereof when the object has a repetitive pattern. However, this apparatus is not capable of performing accurate focus detection for such an object having the repetitive pattern.

SUMMARY OF THE INVENTION

The present invention provides a focus detection apparatus capable of performing accurate focus detection even when an object has a repetitive pattern.

The present invention provides as an aspect thereof a focus detection apparatus that includes circuitry which function as a producer configured to acquire paired phase difference image signals that are produced through photoelectric conversion of an object image formed by an optical system including a focus lens and that have therebetween a phase difference corresponding to a focus state of the object image, and configured to produce focus detection information using the phase difference acquired from the paired phase difference image signals, and an acquirer configured to acquire a feature value relating to a correlation value between the paired phase difference image signals. The producer is configured to acquire the phase difference depending on a result of comparison between the feature values acquired before and after driving of the focus lens.

The present invention provides as another aspect thereof a focus control apparatus including the above focus detection apparatus.

The present invention provides as yet another aspect thereof an image-capturing apparatus including the above focus control apparatus.

The present invention provides as still another aspect thereof a focus detection method that includes a step of acquiring paired phase difference image signals that are produced through photoelectric conversion of an object image formed by an optical system including the focus lens and that have therebetween a phase difference corresponding to a focus state of the object image, a step of producing focus detection information using the phase difference acquired from the paired phase difference image signals, and a step of acquiring a feature value relating to a correlation value between the paired phase difference image signals. The method acquires the phase difference depending on a result of comparison between the feature values acquired before and after driving of the focus lens.

The present invention provides as further another aspect thereof a non-transitory computer-readable storage medium for storing a computer program to cause a computer to execute a focus detection process according to the above focus detection method.

Further features of the present invention will become apparent from the following description of exemplary embodiments with reference to the attached drawings.

BRIEF DESCRIPTION OF THE DRAWINGS

FIGS. 16A and 16B illustrate feature values of the correlation value waveforms illustrated in FIGS. 15A and 15B in the embodiment.

DESCRIPTION OF THE EMBODIMENTS

Exemplary embodiments of the present invention will hereinafter be described with reference to the accompanying drawings.

Figure 1:
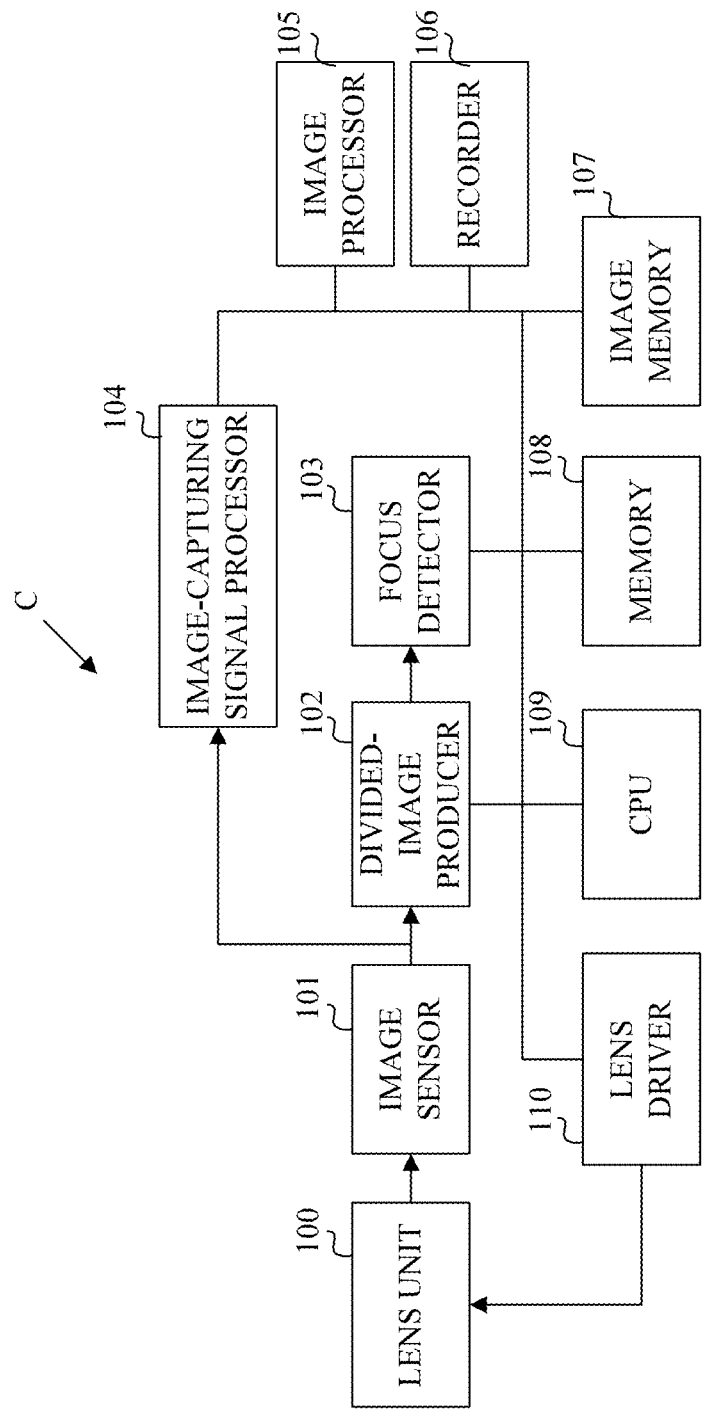
FIG. 1 is a block diagram illustrating a configuration of a camera including a focus detection apparatus that is an embodiment of the present invention.

FIG. 1 illustrates a configuration of a camera C as an image-capturing apparatus, such as a digital camera and a video camera, which includes a focus detection apparatus that is an embodiment of the present invention. The camera C includes a lens unit 100 that is constituted by an image-capturing optical system (imaging optical system) including a focus lens, a magnification-varying lens, an aperture stop and others, and an image sensor 101 that photoelectrically converts, that is, captures an optical image of an object (object image) formed by the image-capturing optical system. The lens unit 100 may be provided integrally with the camera C, and may be provided detachably (interchangeably) to the camera C. The image sensor 101 is constituted by a photoelectric conversion element such as a CCD sensor or a CMOS sensor, and photoelectrically converts the object image by photo diodes provided in multiple pixels.

Figure 2:
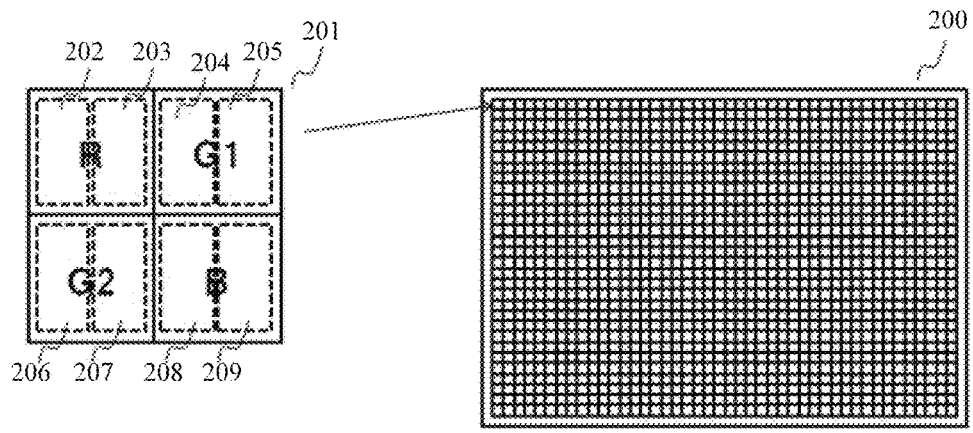
FIG. 2 illustrates a structure of an image sensor used in the camera in the embodiment.

With reference to FIG. 2, description will be made of a pixel arrangement of the image sensor 101. FIG. 2 illustrates in its right part the entire image sensor 101 and in its left part a pixel block 201 that is part of the image sensor 101. The multiple pixels of the image sensor 101 are arranged in a Bayer arrangement. Four pixels in the pixel block 201 includes a pixel R provided with a red color filter (this pixel is hereinafter referred to as "an R pixel"), a pixel B provided with a blue color filter (this pixel is hereinafter referred to as "a B pixel"), and pixels G1 and G2 each provided with a green color filter (these pixels are hereinafter referred to as "a G1 pixel" and "a G2 pixel").

Each pixel includes two (paired) photo diodes as photoelectric converters, and one microlens provided for the paired photo diodes.

The R pixel includes paired photo diodes 202 and 203. The B pixel includes paired photo diodes 208 and 209. The G1 pixel and the G2 pixel respectively include paired photo diodes 204 and 205 and paired photo diodes 206 and 207. In each pixel, the microlens divides an entering light flux into paired light fluxes (that is, performs pupil division) to form paired object images on the paired photo diodes. The paired photo diodes accumulate charges by their photoelectric conversion function.

A divided-image producer 102 reads out paired output signals having voltages corresponding to the accumulated charges of the paired photo diodes in each pixel, as signals (an A signal and a B signal) used for focus detection. An image-capturing signal processor 104 adds the A signal to the B signal, which are the output signals from the paired photo diodes in each pixel, to read out the added signal (hereinafter referred to as an "A+B signal") as a signal used for image capturing. The divided-image producer 102 combines the A signals read out from the respective pixels with one another, and combines the B signals read out from the respective pixels of the image sensor 101 with one another. The combinations of the A signals and the B signals respectively produce an A-image signal and a B-image signal that are paired phase difference image signals used for focus detection and focus lens position control by a sensor-surface phase difference detection method.

A focus detector 103 performs a correction process on each of the A- and B-image signals to correct its optical distortion, and then performs a correlation calculation on the A- and B-image signals to calculate a phase difference between the A- and B-image signals. Furthermore, the focus detector 103 calculates, from the phase difference between the A- and B-image signals, a defocus amount indicating a focus state of the image-capturing optical system (in other words, of the object image). The focus detector 103 serves as a focus detection apparatus including a producer and an acquirer.

A CPU 109 drives the focus lens depending on the calculated defocus amount through a lens driver 110 to provide an in-focus state of the image-capturing optical system. The CPU 109 serves as a controller. In the following description, the focus detection and the focus lens position control by the sensor-surface phase difference detection method are collectively referred to as "sensor-surface phase difference AF". The focus detector 103 and the CPU 109 constitute a focus control apparatus.

The image-capturing signal processor 104 combines the A+B signals read out from the respective pixels of the image sensor 101 with one another to produce an image-capturing signal used for producing a captured image. Furthermore, the image-capturing signal processor 104 performs various processes on the image-capturing signal for correcting its optical distortion and for reducing electrical noise included therein. An image memory 107 temporarily stores the image-capturing signal produced and subjected to the above processes by the image-capturing signal processor 104. An image processor 105 converts the image-capturing signal into a predetermined video data format to produce video data. A recorder 106 records the video data to a recording medium such as a semiconductor memory and an optical disc.

The CPU 109 performs, in addition to the above sensor-surface phase difference AF, control of operations of the above-described respective parts in the camera C and control of drive of the magnification-varying lens and the aperture stop through the lens driver 110. A memory 108 stores a computer program that causes the CPU 109 and the focus detector 103 to execute their control operations and data used therefore.

Figure 3:
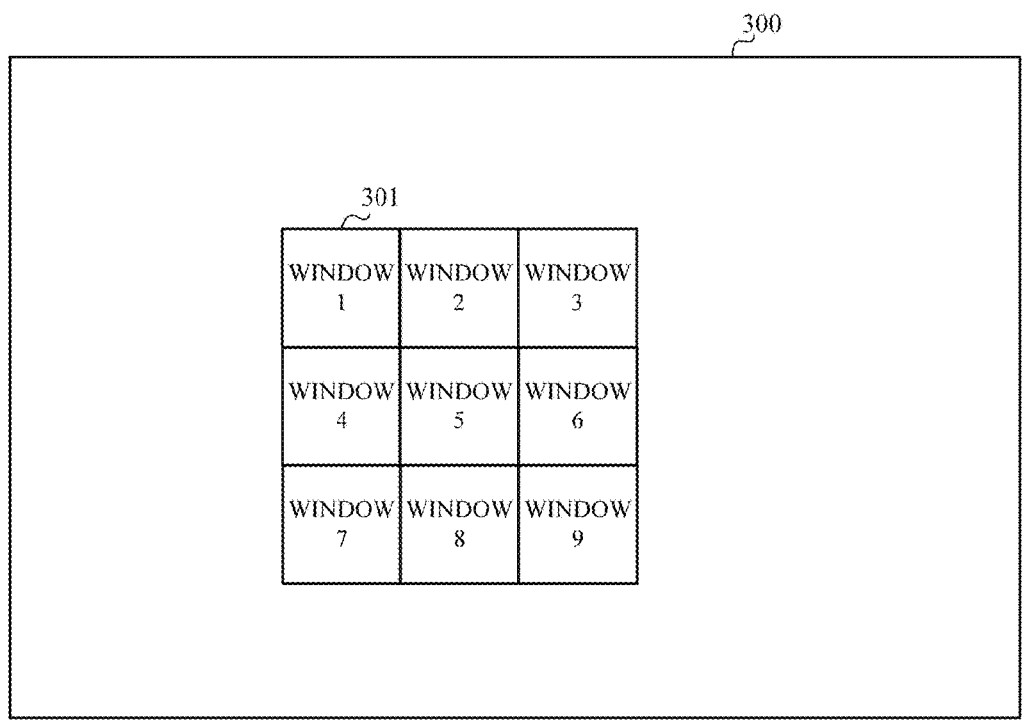
FIG. 3 illustrates focus detection areas in the embodiment.

FIG. 3 illustrates nine focus detection windows 301 (horizontal three windows×vertical three windows) that are focus detection areas set in an image-capturing frame (view angle) of the camera C. The nine focus detection windows 301 are denoted by Window1 to Window9 as illustrated in FIG. 3. This embodiment is capable of simultaneously acquiring the defocus amounts in these nine focus detection windows (Window1 to Window9).

Figure 4:
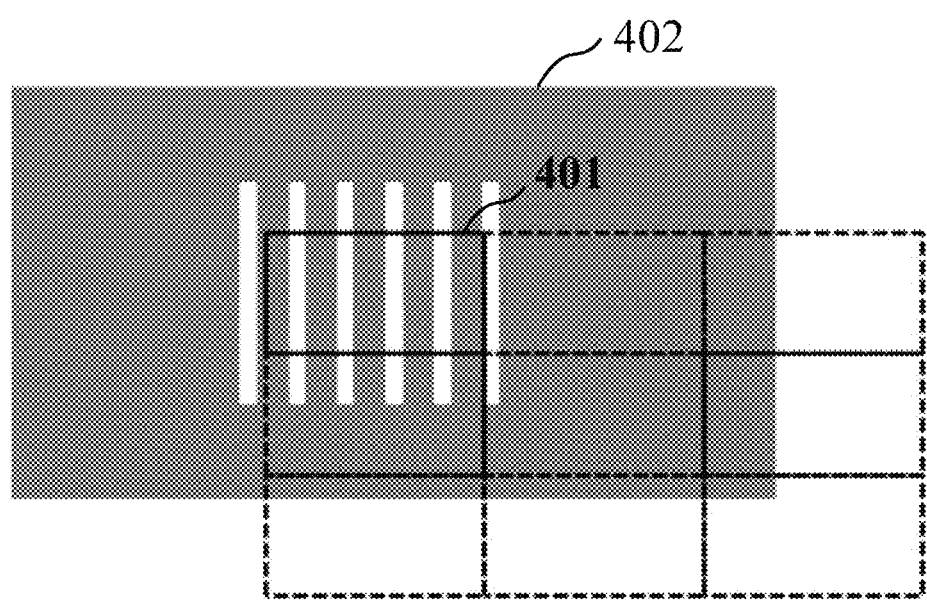
FIG. 4 illustrates a repetitive pattern image and the focus detection areas in the embodiment.
Figure 5A:
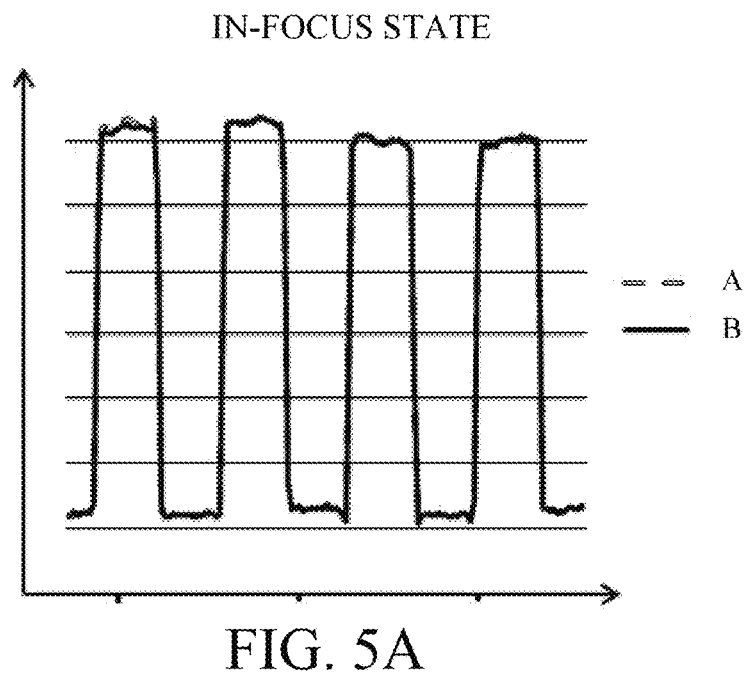
FIGS. 5A and 5B illustrate intensity information of the repetitive pattern image in an in-focus state and an out-of-focus state.
Figure 5B:
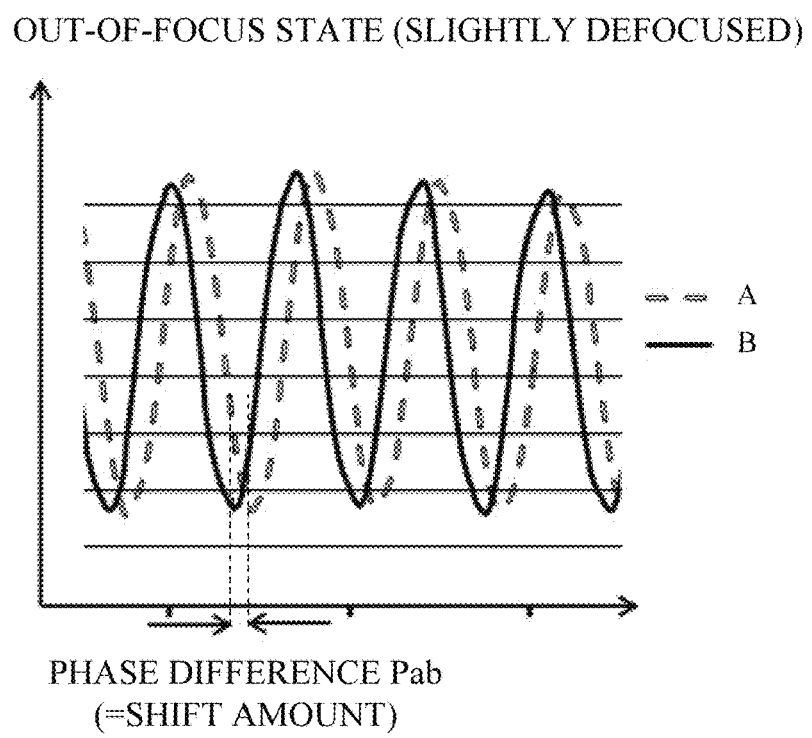

FIG. 4 illustrates a case where the focus detection window (Window1) 401 captures an object image 402 having a periodic contrast (repetitive pattern). This object is hereinafter referred to as "a repetitive pattern image". FIGS. 5A and 5B each illustrate intensity waveforms of the A- and B-image signals produced in one frame from output signals from a pixel area of the image sensor 101 corresponding to the focus detection window (Window1) 401. FIG. 5A illustrates the intensity waveforms of the A- and B-image signals in an in-focus state. In this in-focus state, the intensity waveforms of the A- and B-image signals entirely overlap each other. FIG. 5B illustrates the intensity waveforms of the A- and B-image signals in an out-of-focus state where the object image is slightly defocused. In this out of state out-of-focus state, the intensity waveforms of the A- and B-image signals have a phase difference (hereinafter referred to as "a shift amount") Pab therebetween. The focus detector 103 detects this phase difference Pab by performing the correlation calculation.

Figure 6A:
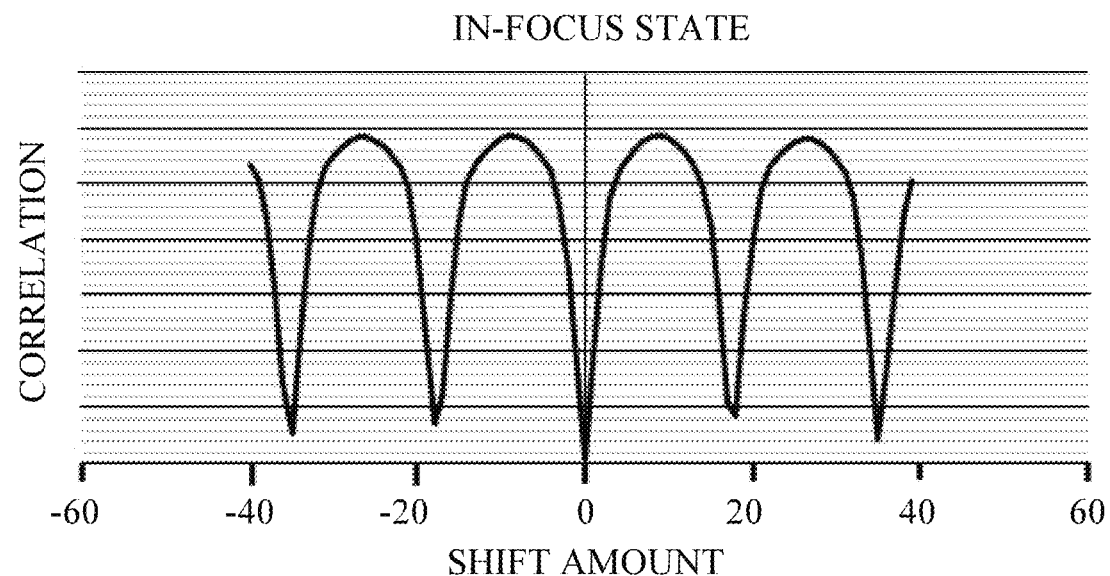
FIGS. 6A and 6B illustrate results of correlation calculations performed on paired phase difference image signals acquired for the repetitive pattern image in the in-focus state and the out-of-focus state.
Figure 6B:
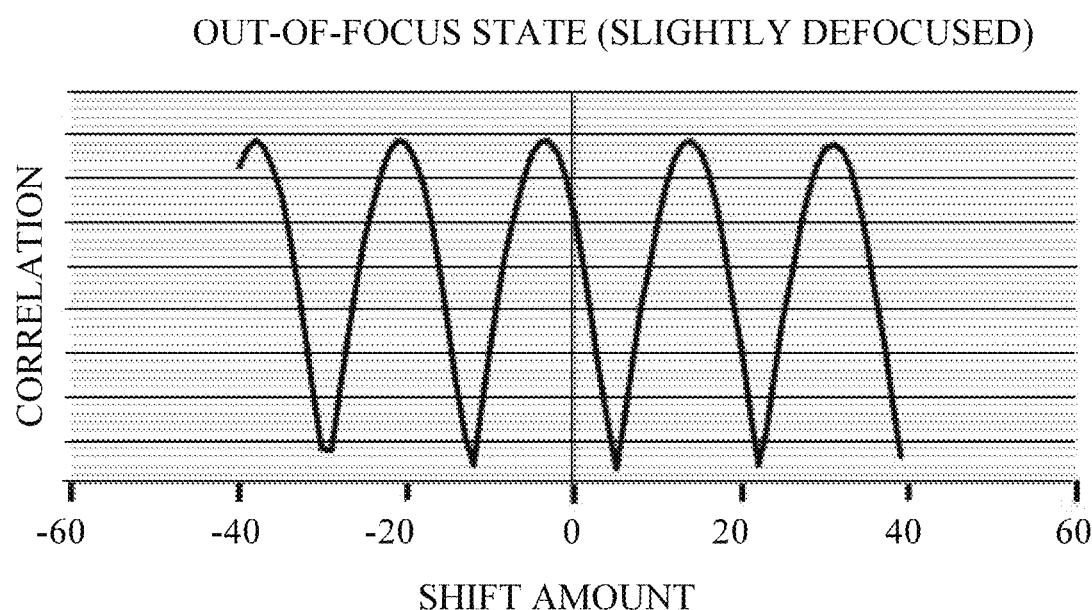

FIGS. 6A and 6B each illustrate a waveform of a correlation value (difference between the paired phase difference image signals) acquired by the correlation calculation performed on the A- and B-image signals in one frame. FIG. 6A illustrates a graph showing a relation between the correlation value and the shift amount (the graph is hereinafter also referred to as "a correlation value waveform") in the in-focus state as in FIG. 5A. FIG. 6B illustrates a graph showing a relation between the correlation value and the shift amount in the out-of-focus state where the object image is slightly defocused as in FIG. 5B. In each of FIGS. 6A and 6B, a horizontal axis indicates the shift amount when the A- and B-image signals are shifted relative to each other in the correlation calculation performed on these A- and B-image signals, and a vertical axis indicates the correlation value. In the correlation calculation performed in this embodiment, a shift amount at which a local minimal value as an extremal value of the correlation value is provided is a specific shift amount at which the A- and B-image signals have a highest correlation therebetween, that is, is a phase difference Pab to be detected.

In each of the in-focus state illustrated in FIG. 6A and the out-of-focus state illustrated in FIG. 6B, the correlation value waveform includes such local minimal values at multiple shift amounts.

However, in the in-focus state illustrated in FIG. 6A, the A- and B-image signals coincide with each other, so that the correlation value becomes a local minimal value at a shift amount of 0. On the other hand, in the out-of-focus state illustrated in FIG. 6B, the correlation value becomes local minimal values at multiple shift amounts differing from 0 to a plus side and a minus side. Therefore, it is impossible to determine, from only the correlation value waveform in this one frame, which shift amount is to be detected as the phase difference Pab in order to provide the in-focus state. This embodiment performs the following process in order to acquire a focus detection phase difference as a phase difference used for calculating a defocus amount by which an accurate in-focus state can be provided even when multiple candidate shift amounts, which are shift amounts (phase differences) as candidates of the focus detection phase difference, are acquired. In the following description, the focus detection phase difference is also simply referred to as "a phase difference".

Figure 7:
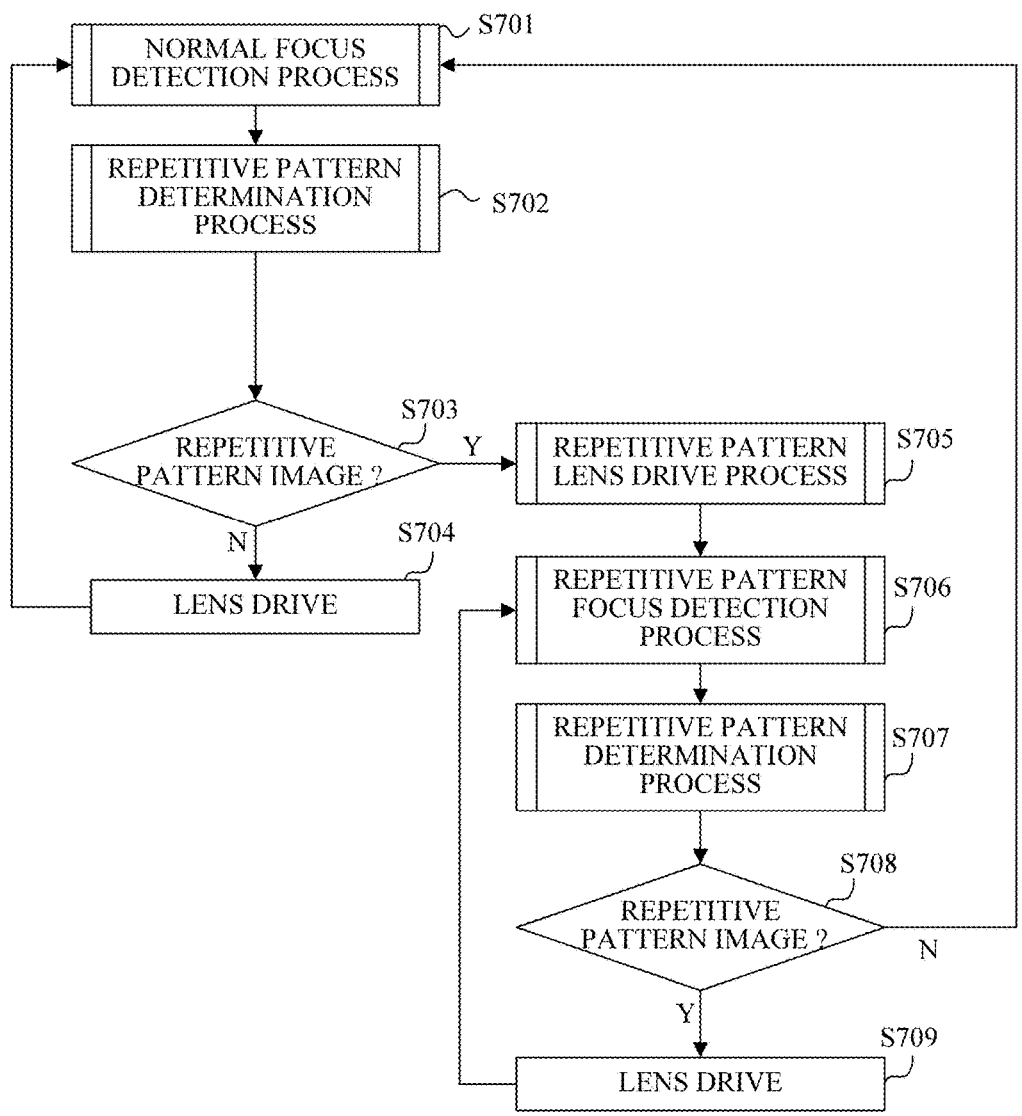
FIG. 7 is a flowchart illustrating a focus control (AF) process in the embodiment.

FIG. 7 is a flowchart illustrating an AF process performed by the focus detector 103 and the CPU 109. The focus detector 103 and the CPU 109 that are computers perform this AF process according to a focus control program (including a focus detection program) as a computer program.

First, the focus detector 103 (and the CPU 109) performs at step S701 a normal focus detection process, which will be described in detail later. Next, at step S702, the focus detector 103 performs a repetitive pattern determination process for determining whether or not the object image is the repetitive pattern image. The repetitive pattern determination process will be described in detail later. At next step S703, the focus detector 103 proceeds to step S705 if the repetitive pattern determination process at step S702 determines that the object image is the repetitive pattern image, and otherwise proceeds to step S704. At step S704, the CPU 109 drives the focus lens depending on the defocus amount acquired by the normal focus detection process performed at step S701.

On the other hand, at step S705 the focus detector 103 and the CPU 109 perform a repetitive pattern lens drive process that is a process to be performed only when the object image is the repetitive pattern image. The repetitive pattern lens drive process will be described in detail later. At next step S706, the focus detector 103 (and the CPU 109) performs a repetitive pattern focus detection process, which will be described in detail later. Then, at next step S707, the focus detector 103 again performs the repetitive pattern determination process as at step S702.

Furthermore, at next step S708, the focus detector 103 proceeds to step S709 if the repetitive pattern determination process at step S707 determines that the object image is the repetitive pattern image, and otherwise returns to step S701. At step S709, the CPU 109 drives the focus lens depending on the defocus amount calculated in the repetitive pattern focus detection process performed at step S706 by the focus detector 103.

Figure 8:
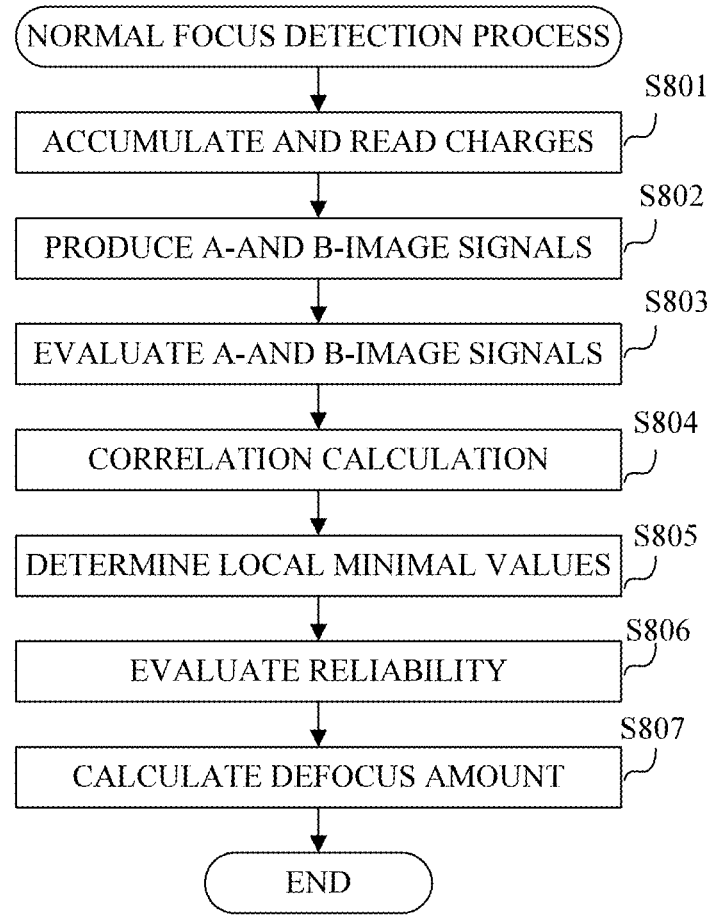
FIG. 8 is a flowchart illustrating a focus detection process in the embodiment.

Description will be made of the normal focus detection process performed at step S701 with reference to a flowchart of FIG. 8. In the normal focus detection process, the CPU 109 causes at step S801 each pixel (paired photo diodes) of the image sensor 101 to accumulate charges, and then causes the divided-image producer 102 to read out the accumulated charges (A and B signals) from each pixel.

At next step S802, the CPU 109 causes the divided-image producer 102 to produce the A- and B-image signals, and further causes the focus detector 103 to perform the above-mentioned correction process for correcting their optical distortions.

At next step s803, the focus detector 103 evaluates intensity levels of the A- and B-image signals. In other words, the focus detector 103 evaluates contrast states of the A- and B-image signals. Next at step S804, the focus detector 103 performs a band-pass filter process on the A- and B-image signals, and thereafter performs the correlation process on the A- and B-image signals.

The focus detector 103 thus acquires the correlation value waveform.

Next at step S805, the focus detector 103 detects a local minimal value of the correlation value from the correlation value waveform, and evaluates at next step S806 probability of the local minimal value as reliability thereof. The reliability is evaluated by using, for example, the contrast states acquired at step S803 and a degree of coincidence between the A- and B-image signals.

Finally, at step S807, the focus detector 103 sets, if the reliability is higher than a predetermined threshold, as the phase difference, the shift amount at which the local minimal value of the correlation value detected at step S805 is provided, and calculates, from the phase difference, the defocus amount as the focus detection information.

Figure 9:
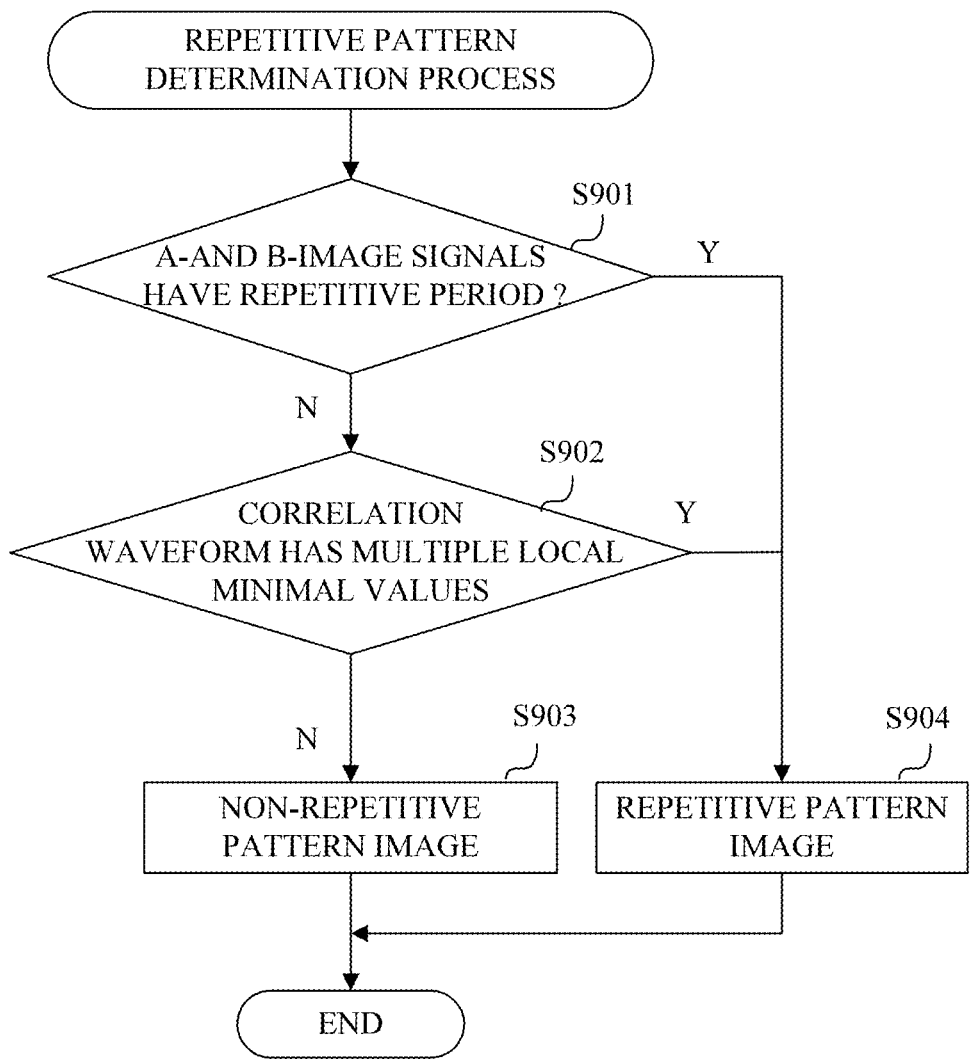
FIG. 9 is a flowchart illustrating a repetitive pattern determination process in the embodiment.

Next, description will be made of the repetitive pattern determination process performed at step S702 with reference to a flowchart of FIG. 9. In the repetitive pattern determination process, at step S901 the focus detector 103 first evaluates the A- and B-image signals by using their intensity waveforms. Specifically, the focus detector 103 determines whether or not the intensity levels of the A- and B-image signals approximately coincide with each other and whether or not repetitive period of the A- and B-image signals (that is, of the object image) is distinct by measuring distances (intervals) between rising edges or falling edges of the intensity waveforms of the A- and B-image signals illustrated as an example in FIGS. 5A and 5B.

The intensity waveforms illustrated in FIGS. 5A and 5B indicate that the object image is an extreme repetitive pattern image. If the intensity levels approximately coincide with each other and the repetitive period of the object image is distinct, the focus detector 103 proceeds to step S904 to determine that the object image is the repetitive pattern image, and then ends this process. On the other hand, if the repetitive period of the object image is not distinct (for example, if the object image has a significant variation in intensity level or repetitive period), it is impossible to determine whether or not the object image is the repetitive pattern image. Thus, the focus detector 103 proceeds to step S902.

At step S902, the focus detector 103 evaluates the A- and B-image signals by using the correlation value waveform acquired by the correlation calculation. Specifically, the focus detector 103 determines whether or not the correlation value waveform has multiple local minimal values and whether or not the local minimal values have similar levels to one another. The local minimal values having the similar levels means that the local minimal values are close in value to one another. That is, the focus detector 103 at step S902 determines whether or not the correlation value waveform has multiple local minimal values close in value to one another. A range in which the local minimal values are determined to have the similar level can be appropriately set. If the correlation value waveform has the multiple local minimal values having the similar levels, the focus detector 103 proceeds to step S904 to determine that the object image is the repetitive pattern image, and then ends this process. On the other hand, if the correlation value waveform does not have such multiple similar level local minimal values, the focus detector 103 proceeds to step S903 to determine that the object image is not the repetitive pattern image, and then ends this process.

Next, description will be made of the repetitive pattern lens drive process performed at step S705 with reference to a flowchart of FIG. 10 and to FIGS. 11A and 11B. This process is performed, as described above, only when the object image is the repetitive pattern image. FIG. 11A illustrates an example of the correlation value waveform, and FIG. 11B illustrates numerical values detected or calculated from this correlation value waveform.

First, at step S1001, the focus detector 103 detects the multiple local minimal values from the correlation value waveform, and stores multiple candidate shift amounts at which the local minimal values are provided. In addition, the focus detector 103 calculates the intervals between respective mutually adjacent ones of the multiple candidate shift amounts (that is, between respective mutually adjacent phase differences) and central values of the intervals, and store the calculated intervals and central values.

For example, as illustrated in FIG. 11A, when detecting similar level local minimal values at shift amounts S1, S2, S3, and S4, the focus detector 103 stores these shift amounts S1 to S4 as the candidate shift amounts. Furthermore, the focus detector 103 stores intervals W1, W2, and W3 between the candidate shift amounts S1 to S4, in relation to the candidate shift amounts S1 to S4. Moreover, the focus detector 103 calculates central values O1, O2, and O3 of the intervals W1, W2, and W3 using an expression of (Si+S(i+1))/2 (i=1 to 3) to store the central values O1, O2, and O3. A table of FIG. 11B illustrates feature values (the shift amounts S1 to S4, the intervals W1 to W3, and the central values O1 to O3) relating to the correlation value stored by the focus detector 103. The feature value relating to the correlation value is hereinafter referred to as "a correlation feature value".

Next at step S1002, the focus detector 103 proceeds to any one of steps S1003, S1005, and S1008 depending on a positional relation between the multiple candidate shift amounts detected at step S1001, in other words, a relation of the multiple candidate shift amounts relative to a reference phase difference that is a shift amount of 0 corresponding to an in-focus state.

Specifically, when the multiple candidate shift amounts exist on one of a plus (infinite distance) side and a minus (close distance) side, the focus detector 103 proceeds to step S1003 to select a candidate shift amount closest to 0 as the phase difference (first phase difference).

FIG. 11A illustrates a case where the candidate shift amounts S3 and S4 exist on the plus side and the candidate shift amounts S1 and S2 exist on the minus side. The focus detector 103 proceeds to step S1003 in a case where, for example, only the candidate shift amounts S3 and S4 exist to select the candidate shift amount S3 closest to 0 as the phase difference.

Then, the focus detector 103 proceeds to step S1004 to calculate the defocus amount for a subsequent focus lens drive.

For example, the focus detector 103 having selected the candidate shift amount S3 as the phase difference calculates the defocus amount from this shift amount S3. The CPU 109 calculates a lens drive amount from the defocus amount, and proceeds to step S1010. That is, the CPU 109 regards the candidate shift amount S3 closest to 0 as a true phase difference used for driving the focus lens.

On the other hand, when at step S1002 any one of the multiple candidate shift amounts exists around 0 corresponding to the in-focus state, that is, for example, in a range from 2Fδ to 3Fδ (F represents an F-number of the image-capturing optical system, and δ represents a diameter of a permissible circle of confusion), the focus detector 103 proceeds to step S1005.

At step S1005, the focus detector 103 determines whether or not it is in an in-focus state. In the in-focus state, the A- and B-image signals have a high degree of coincidence, and the image-capturing signal (A+B image signal) and the A-image signal also have a high degree of coincidence. The focus detector 103 proceeds to step S1006, if results of comparison of these degrees of coincidence with predetermined thresholds indicate that it is in the in-focus state, to select the candidate shift amount around 0 (closest to 0) as the phase difference (first phase difference).

Then, at step S1007, the focus detector 103 calculates, as at step S1004, the defocus amount from the selected phase difference. The CPU 109 calculates a subsequent lens drive amount from the defocus amount, and proceeds to step S1010.

On the other hand, when the multiple candidate shift amounts exist on both the plus and minus side at step S1002 as illustrated in FIG. 11A, the focus detector 103 proceeds to step S1008. At step S1008, the focus detector 103 selects, out of the multiple candidate shift amounts, depending on a state of the focus lens (lens status) and a contrast value (contrast state), one candidate shift amount that is estimated as the most probable true phase difference with a highest possibility, as the phase difference (first phase difference).

FIG. 12 illustrates, as an example, in a lens status where a current position of the focus lens may provide a defocus amount from −6 mm to +6 mm, possibilities of defocus amounts determined from the lens status and the contrast value. The example of FIG. 12 indicates that, from the lens status, the candidate shift amounts S2, S3, and S4 are determined to be probable true phase differences. A relatively high contrast value allows estimating that the defocus amount is small. Thus, the focus detector 103 determines that the candidate shift amount S3 whose absolute value is smallest is the most probable true phase difference to select the candidate shift amount S3 as the phase difference. The focus detector 103 selects the phase difference within a range of half the interval (difference) between the candidate shift amounts from the shift amount of 0. In the example of FIG. 12, the candidate shift amount S3 (=+3.5) is half or less the interval W2 (=18.7) between the candidate shift amount S3 and the candidate shift amount S2 adjacent thereto. Therefore, the candidate shift amount S3 is within the range of half the interval between the candidate shift amounts from the shift amount of 0. Accordingly, the focus detector 103 calculates the defocus amount using the candidate shift amount S3 selected as the phase difference.

When the candidate shift amount is not within the range of half the interval between the candidate shift amounts from the shift amount of 0, there is another candidate shift amount whose absolute value is smaller than that of the above candidate shift amount, so that the focus detector 103 finds the other candidate shift amount and selects it as the phase difference.

Thereafter, at next step S1009, the CPU 109 calculates the subsequent lens drive amount from the defocus amount calculated at step S1008, and then proceeds to step S1010.

At step S1010, the CPU 109 drives the focus lens by the calculated lens drive amount, and ends the repetitive pattern lens drive process.

Figure 13:
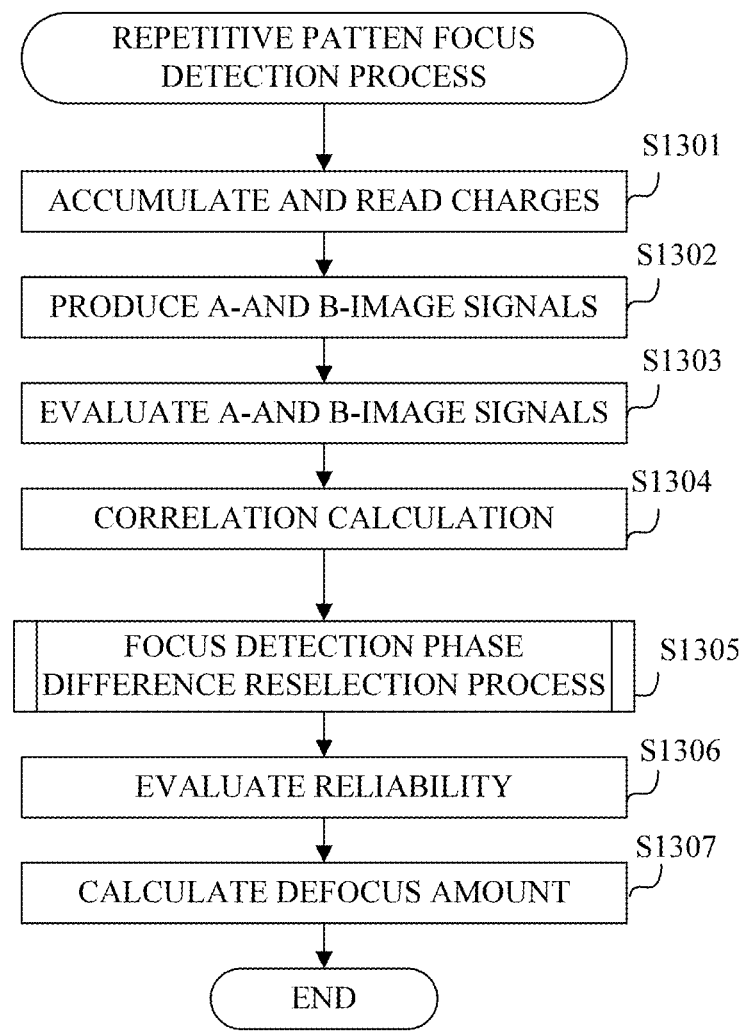
FIG. 13 is a flowchart illustrating a repetitive pattern focus detection process in the embodiment.

Next, description will be made of the repetitive pattern focus detection process performed at step S706 with reference to a flowchart of FIG. 13. In the repetitive pattern focus detection process, the CPU 109 first causes at step S1301 each pixel (paired photo diodes) of the image sensor 101 to accumulate charges, and then causes the divided-image producer 102 to read out the accumulated charges (A and B signals) from each pixel.

Next at step S1302, the CPU 109 causes the divided-image producer 102 to produce the A- and B-image signals, and further causes the focus detector 103 to perform the correction process for correcting the optical distortions of the A- and B-image signals.

Next at step S1303, the focus detector 103 evaluates the intensity levels of the A- and B-image signals, that is, evaluates the contrast states of the A- and B-image signals.

At next step S1304, the focus detector 103 performs the band-pass filter process on each of the A- and B-image signals, and then performs the correlation calculation on the A- and B-image signals. The focus detector 103 thereby acquires the correlation value waveform.

Figure 14:
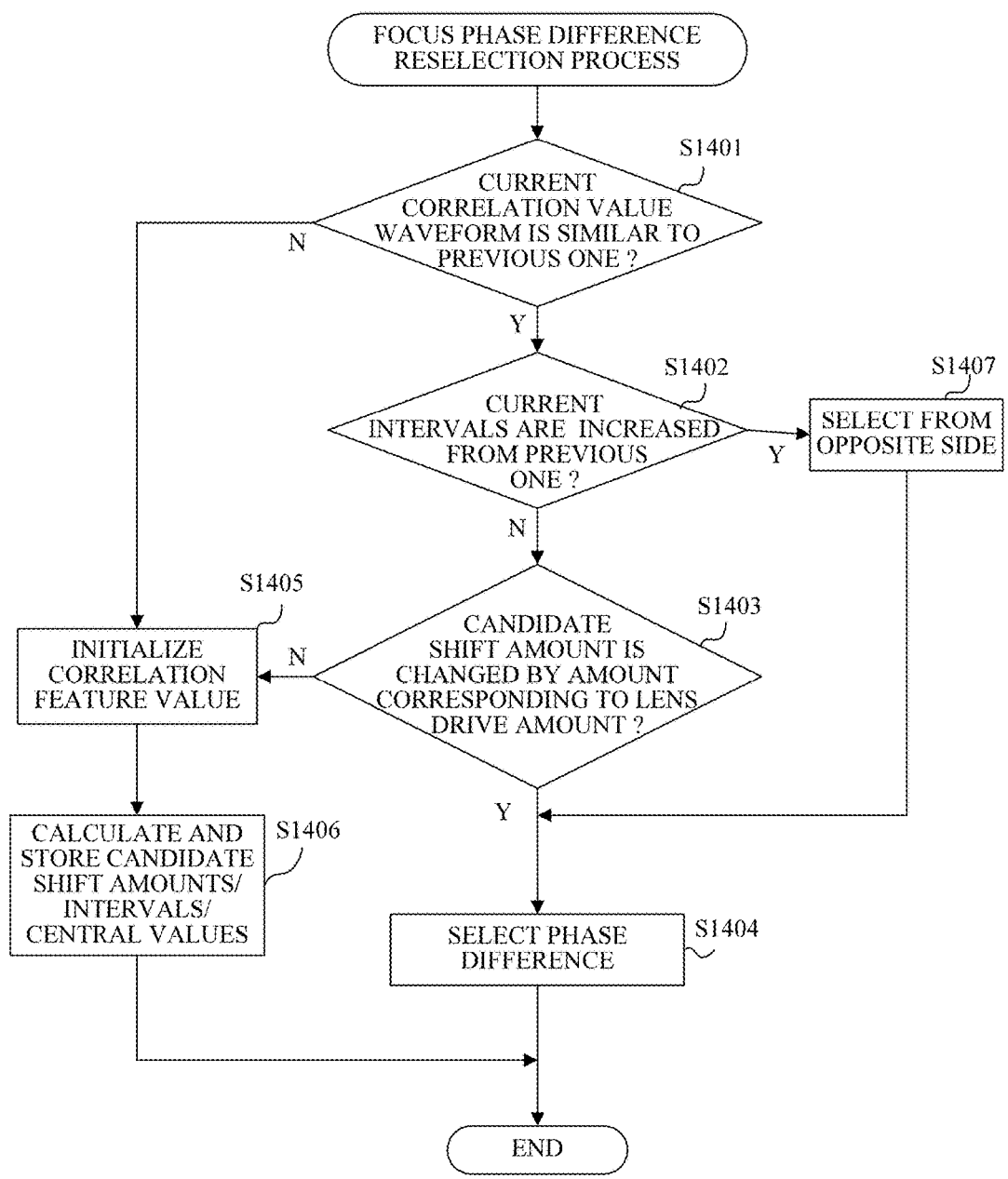
FIG. 14 is a flowchart illustrating a focus detection phase difference reselection process in the embodiment.

At next step S1305, the focus detector 103 performs a focus detection phase difference reselection process using the correlation value waveform. With reference to a flowchart of FIG. 14 and FIGS. 15A and 15B, description will be made of the focus detection phase difference reselection process.

At step S1401, the focus detector 103 compares the correlation feature value currently acquired after driving of the focus lens with the feature value previously acquired before driving of the focus lens, and determines from a result of the comparison whether or not the correlation value waveform currently acquired is similar to the correlation value waveform previously acquired. In other words, the focus detector 103 determines whether or not the current feature value is similar to the previous feature value, or whether or not the current feature value is changed from the previous feature value to a value corresponding to after the driving of the focus lens. Specifically, the focus detector 103 determines whether or not the candidate shift amounts at which the local minimal values are provided in the current correlation value waveform are changed from the candidate shift amounts in the previous correlation value waveform by a change amount corresponding to the lens drive amount when the focus lens has been driven at step S1010. Furthermore, the focus detector 103 determines whether or not the intervals between the candidate shift amounts in the current correlation value waveform are equivalent to those between the candidate shift amounts in the previous correlation value waveform. In the example of FIG. 11B, the intervals are approximately 18. Moreover, the focus detector 103 determines whether or not a repetitive state of the current correlation value waveform (that is, the number of the candidate shift amounts) is equivalent to that of the previous correlation value waveform.

If results of these determinations are all negative, that is, if the current correlation value waveform is not similar to the previous correlation value waveform, the focus detector 103 proceeds to step S1405 to determine that a current object image is changed from the previous one and therefore initialize the correlation feature value. Next at step S1406, the focus detector 103 calculates the current candidate shift amounts, the intervals therebetween, and the central values of the intervals to store them as new correlation feature values. Then, the focus detector 103 ends this process without selecting the phase difference from the candidate shift amounts. On the other hand, if the current correlation value waveform is similar to the previous correlation value waveform, the focus detector 103 proceeds to step S1402 to determine whether or not the intervals between the candidate shift amounts in the current correlation value waveform are increased relative to those of the candidate shift amounts in the previous correlation value waveform. If the current intervals are increased, the focus detector 103 determines that a drive direction of the focus lens at step S1010 was an incorrect direction in which the defocus amount increases, and proceeds to step S1407.

At step S1407, the focus detector 103 switches its selection of the candidate shift amount so as to select one existing in an opposite direction (the minus side in FIG. 11A) to the focus lens drive direction at step S1010 as the focus detection phase difference. That is, the focus detector 103 selects a phase difference that is different from one corresponding to the first phase difference as the focus detection phase difference.

If the intervals are decreased at step S1402, the focus detector 103 proceeds to step S1403. At step S1403, the focus detector 103 determines, as at previous step S1401, whether or not the current candidate shift amounts are changed from the previous candidate shift amounts by the change amount corresponding to the lens drive amount when the focus lens has been driven at step S1010. That is, the focus detector 103 determines whether or not the current candidate shift amounts are correctly changed. If the current candidate shift amounts are correctly changed, the focus detector 103 proceeds to step S1404. At this step S1404, the focus detector 103 determines that the previous selection of the candidate shift amount S3 as the phase difference is correct, and therefore continuously selects a candidate shift amount changed from the previously selected candidate shift amount (first phase difference) as a new focus detection phase difference. That is, the focus detector 103 selects a phase difference corresponding to the first phase difference as the focus detection phase difference. Then, the focus detector 103 calculates the defocus amount from the focus detection phase difference, and the CPU 109 drives the focus lens depending on the defocus amount.

On the other hand, if at step S1403 the current candidate shift amounts are not correctly changed, the focus detector 103 proceeds to step S1405 to initialize the correlation feature values. Thereafter, the focus detector 103 proceeds to step S1406 to store the new correlation feature values, and ends this process without selecting the phase difference.

Returning to FIG. 13, at step S1306, the focus detector 103 evaluates probability of the local minimal values of the correlation value corresponding to the phase difference selected at step S1305, as reliability thereof. At this step S1306, as at step S806, the focus detector 103 evaluates the reliability using the contrast states and the degree of coincidence of the A- and B-image signals.

Finally, at step S1307, the focus detector 103 calculates, if the reliability is higher than the predetermined threshold, the defocus amount from the phase difference selected at step S1305, and then ends this process. When having selected no phase difference at step S1305, the focus detector 103 determines that a defocus amount calculation error occurs, and then ends this process. The CPU 109 may display an error sign on a display unit provided to the camera C.

The above-described process can drive the image-capturing optical system to an in-focus direction even when the object has a repetitive pattern. An additional description will be made using correlation value waveforms illustrated in FIGS. 15A and 15B.

Figure 15A:
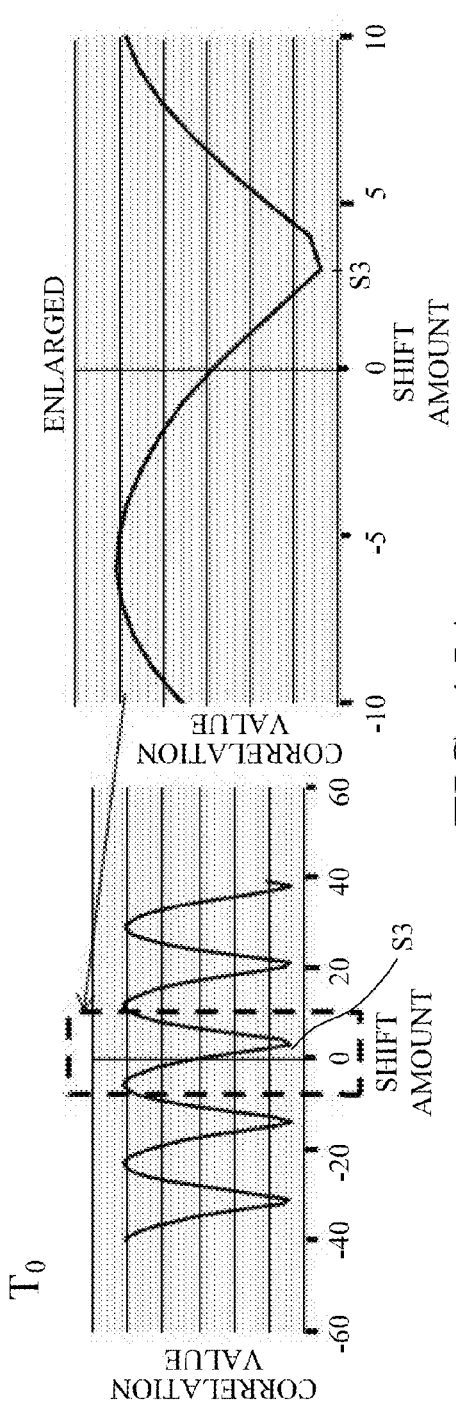
FIGS. 15A and 15B illustrate relations between correlation values and shift amounts (correlation value waveforms) acquired in time series in the embodiment.
Figure 15B:
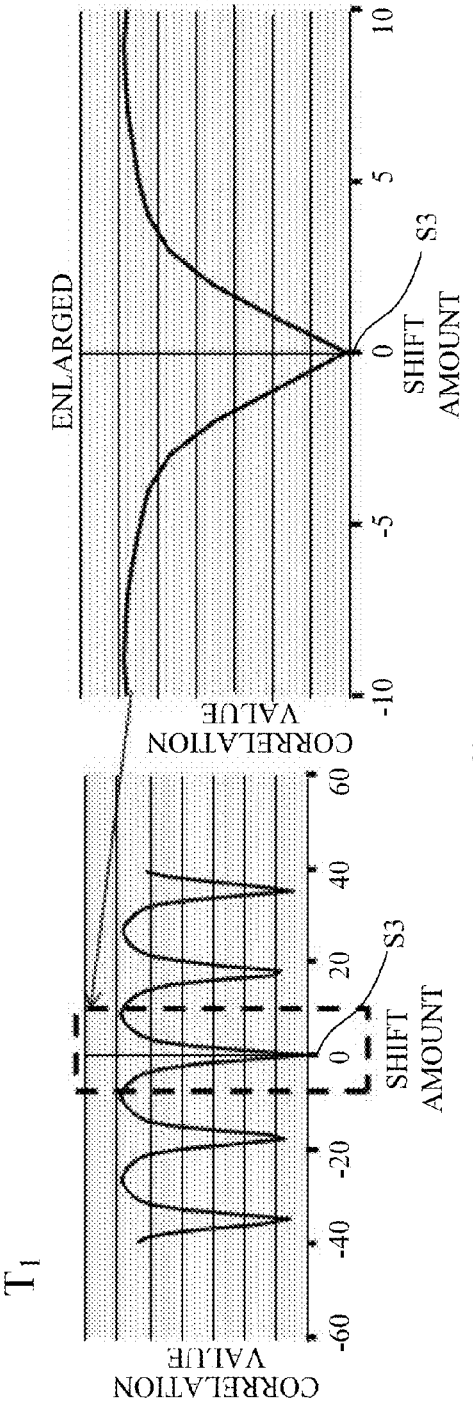

FIG. 15A illustrates in its left part a correlation value waveform acquired at a time $T_0$. This correlation value waveform is equivalent to that illustrated in FIG. 11A. FIG. 15A illustrates in its right part an enlarged view of a shift amount range from −10 to +10 in the correlation value waveform. FIG. 15B illustrates in its left part a correlation value waveform acquired at a time $T_1$ after the focus lens is driven depending on the defocus amount corresponding to +3.5 that is the above-described candidate shift amount S3. FIGS. 16A and 16B respectively illustrate correlation feature values acquired at the times $T_0$ and $T_1$. The correlation value waveforms illustrated in FIGS. 15A and 15B indicate that the candidate shift amount S3 selected (estimated) as the phase difference is changed from the time $T_0$ to the time $T_1$ by the focus lens drive amount and that the intervals W (illustrated in FIGS. 16A and 16B) between the candidate shift amounts approximately coincide with each other, so that these correlation value waveforms can be determined to be ones for the same repetitive pattern image. Furthermore, in FIGS. 15B and 16B, a correlation value at the shift amount of 0 (=S3) is lowest (that is, the degree of coincidence between the A- and B-image signals is highest), so that the focus state can be determined to be an in-focus state.

Figure 10:
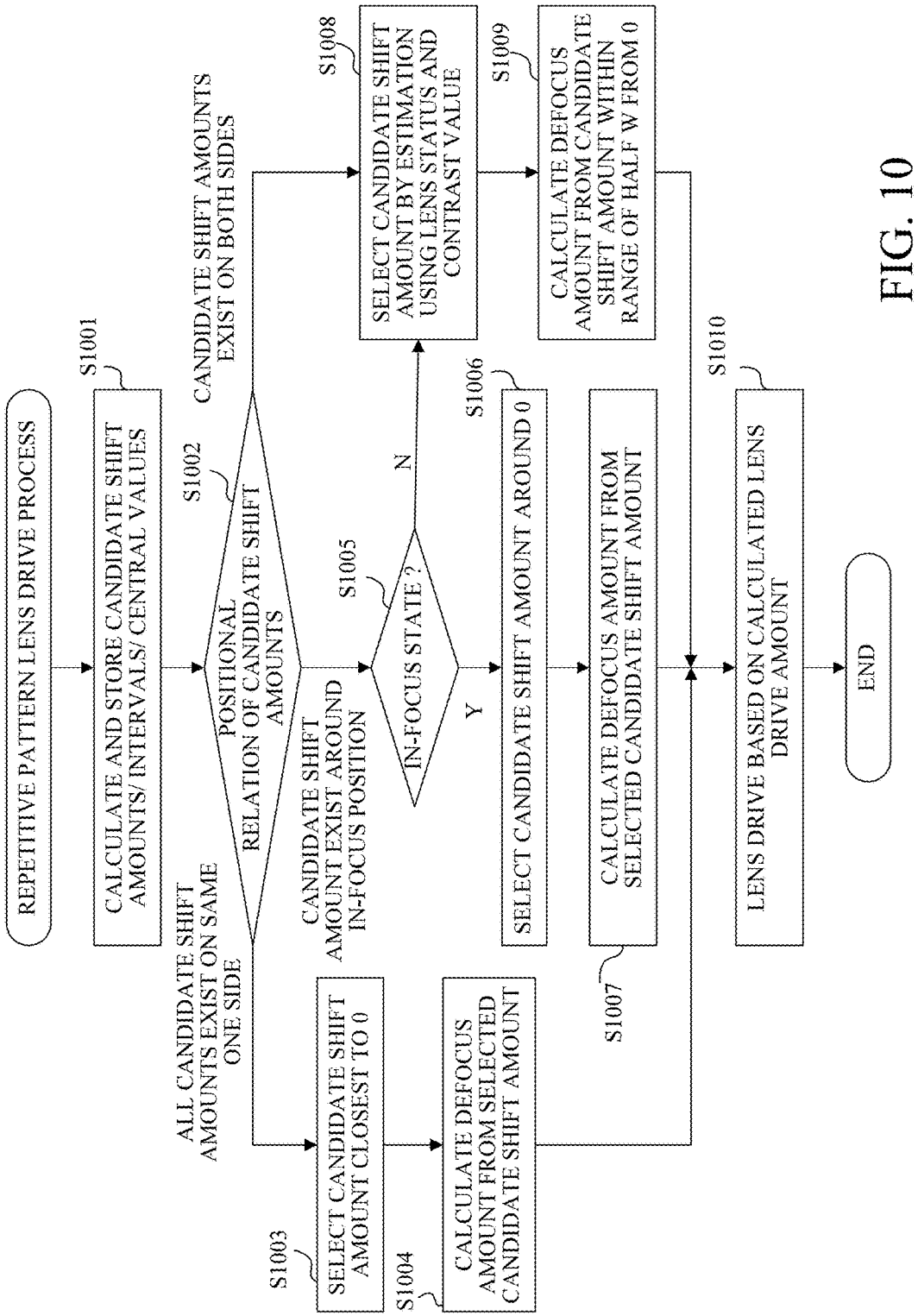
FIG. 10 is a flowchart illustrating a repetitive pattern lens drive process in the embodiment.
Figures 11A, 11B, 12:
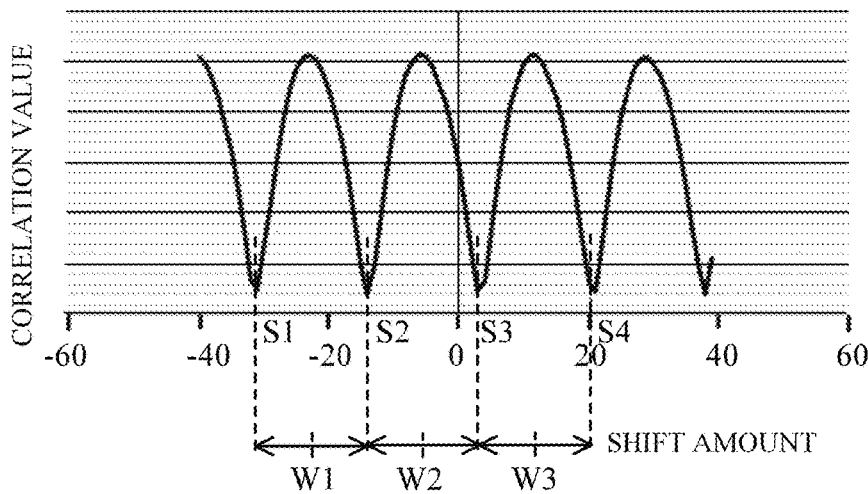
FIGS. 11A and 11B illustrate a correction feature value in the embodiment.
FIG. 12 illustrates an example of phase difference estimation in the embodiment.
Figure 17A:
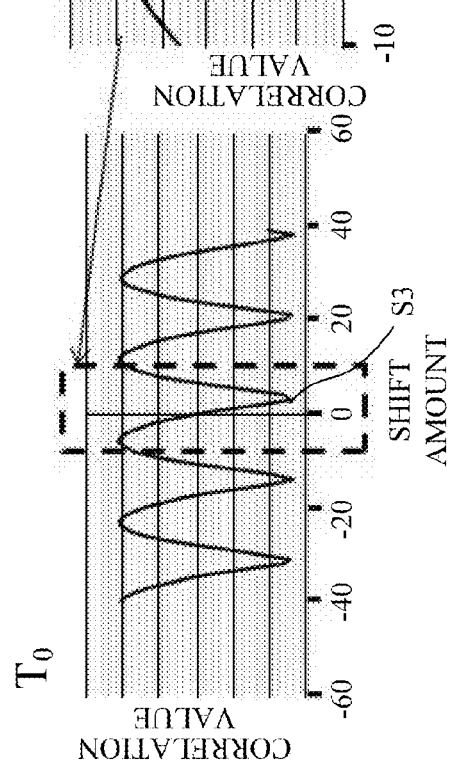
FIGS. 17A and 17B illustrate other relations between correlation values and shift amounts acquired in time series in the embodiment.
Figure 17A:
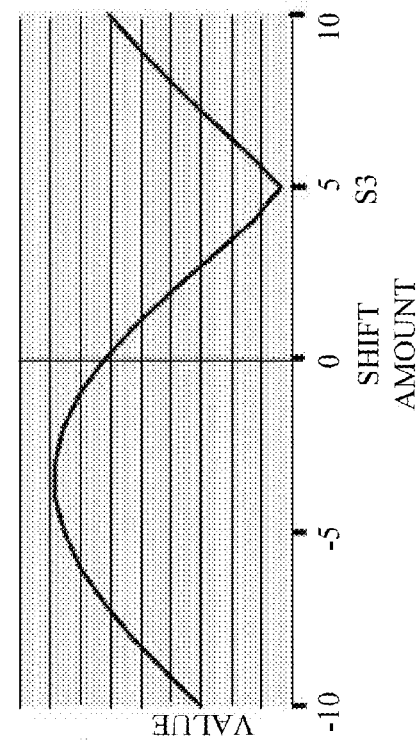
Figure 17B:
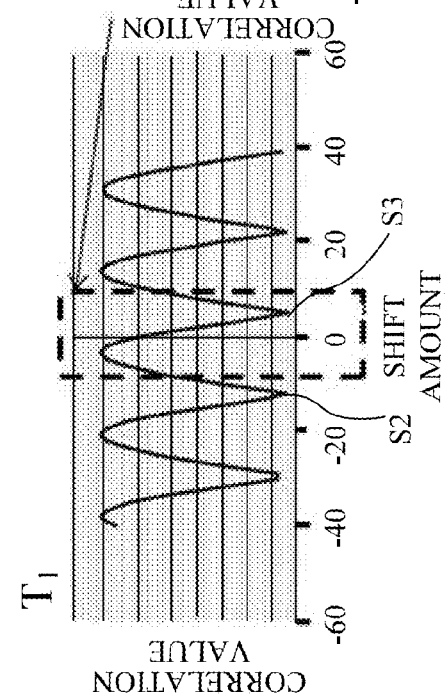

In addition, FIGS. 17A and 17B illustrate an example of change of a correlation value waveform when, though the candidate shift amount S3 existing on the plus side is selected as the phase difference at step S1008 in FIG. 10, a true phase difference exists on the minus side.

In this example, even though the plus side candidate shift amount S3 (=+3.5) in FIG. 17A is selected as a true phase difference and the focus lens is driven, the candidate shift amount S3 increases to 5 as illustrated in FIG. 17B. In this case, the plus side candidate shift amount S3 can be determined to have been erroneously selected, and therefore a minus side candidate shift amount S2 can be selected at a subsequent focus lens drive.

As described above, this embodiment enables, in the sensor-surface phase difference AF, rapid and accurate focus detection and focus lens drive even when the object has the repetitive pattern.

Although the above-described embodiment determines whether or not the drive direction of the focus lens is correct by determining whether or not the intervals between the candidate shift amounts as one correlation feature value is increased, another correlation feature value than the interval may be used. For example, as illustrated in FIGS. 17A and 17B, when the drive direction is incorrect, the absolute value of the candidate shift amount used as the first phase difference is increased by driving the focus lens. Thus, the drive direction of the focus lens may be determined to be correct or incorrect by determining whether or not the focus lens drive increases the absolute value of the candidate shift amount (local minimal amount).

Furthermore, since the central value O between the candidate shift amounts is changed with change in the interval therebetween, the central value O can be used, as well as the interval, for determining whether the drive direction of the focus lens is correct or incorrect. Moreover, the drive direction of the focus lens may be determined to be correct or incorrect by using a contrast value of a captured image (A+B image signal), the A-image signal or the B-image signal. If the focus lens drive increases the contrast value, the drive direction of the focus lens can be determined to be correct.

In addition, the drive direction of the focus lens may be determined to be correct or incorrect by using the correlation value. As illustrated in FIGS. 6A and 6B, as the focus lens approaches an in-focus position, the correlation value becomes lower. Therefore, if the focus lens drive decreases the correlation value (that is, increases a correlation between the A- and B-image signals), the drive direction of the focus lens can be determined to be correct. The correlation value significantly becomes lower as the focus lens approaches the in-focus position in a range where the shift amount is small, so that it is desirable to compare correlation values as local minimal values at shift amounts whose absolute values are small.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-119197, filed on Jun. 15, 2016, which is hereby incorporated by reference herein in its entirety.

What is claimed is:

1. A focus detection apparatus comprising circuitry which function as:
   a producer configured (a) to acquire paired phase difference image signals that are produced through photoelectric conversion of an object image formed by an optical system including a focus lens and that have therebetween a phase difference corresponding to a focus state of the object image, and (b) to produce focus detection information using the phase difference acquired from the paired phase difference image signals;
   an acquirer configured to acquire a feature value relating to a correlation value between the paired phase difference image signals; and
   a determiner configured to determine whether or not multiple phase differences usable for producing the focus detection information are acquired from the paired phase difference image signals,
   wherein the producer is configured to acquire the phase difference depending on a result of comparison between the feature values acquired before and after driving of the focus lens, and
   wherein the producer is configured to select, when the multiple phase differences are acquired, depending on the result of the comparison between the feature values acquired before and after driving of the focus lens, a focus detection phase difference from one of the multiple phase differences to be used for producing the focus detection information.

2. A focus detection apparatus according to claim 1, wherein the determiner is configured to determine whether or not the multiple phase differences are acquired by using waveforms of the paired phase difference image signals or a waveform of the correlation value.

3. A focus detection apparatus according to claim 1, wherein the determiner is configured to determine whether or not the multiple phase differences corresponding respectively to extremal values of a waveform of the correlation value are acquired.

4. A focus detection apparatus according to claim 1, wherein the determiner is configured to determine that the multiple phase differences are acquired from the paired phase difference image signals produced when the object image has a repetitive pattern.

5. A focus detection apparatus according to claim 1, wherein the producer is configured to:
   select, when all the multiple phase differences exist on one of plus and minus sides relative to a reference phase difference, a phase difference closest to the reference phase difference as the focus detection phase difference; and
   select, when the multiple phase differences exist on both plus and minus sides relative to a reference phase difference, the focus detection phase difference by estimation using at least one of a state of the focus lens and a contrast state of the paired phase difference image signals.

6. A focus detection apparatus according to claim 5, wherein the producer is configured to select, when selecting the focus detection phase difference by the estimation, a phase difference within a range of half a difference between the multiple phase differences from the reference phase difference, as the focus detection phase difference.

7. A focus detection apparatus according to claim 1, wherein the acquirer is configured to acquire, as the feature value, the multiple phase differences and a difference therebetween.

8. A focus detection apparatus according to claim 7, wherein the acquirer is configured to acquire, as the feature value, a central value of the difference between the multiple phase differences.

9. A focus detection apparatus according to claim 1, wherein the producer is configured to, when the multiple phase differences are acquired:
   acquire the feature value before driving of the focus lens and select, from the multiple phase differences, a first phase difference depending on a relation of the multiple phase differences relative to the reference phase difference;
   acquire the feature value after driving of the focus lens based on the phase detection information produced from the first phase difference; and
   select the focus detection phase difference from the multiple phase differences acquired after the driving of the focus lens, depending on a result of comparison between the feature values acquired before and after the driving of the focus lens.

10. A focus detection apparatus according to claim 9, wherein the producer is configured to:
    determine in the comparison whether or not the feature value acquired after the driving of the focus lens is changed from the feature value acquired before the driving of the focus lens to a value corresponding to after the driving of the focus lens; and
    select, when the feature value acquired after the driving of the focus lens is changed to the value corresponding to after the driving of the focus lens, a phase difference corresponding to the first phase difference among the multiple phase differences acquired after the driving of the focus lens, as the focus detection phase difference.

11. A focus detection apparatus according to claim 10, wherein the producer is configured to select, when the feature value acquired after the driving of the focus lens is not changed to the value corresponding to after the driving of the focus lens, a phase difference different from the first phase difference among the multiple phase differences acquired after the driving of the focus lens, as the focus detection phase difference.

12. A focus detection apparatus according to claim 1, wherein the producer is configured to acquire the paired phase difference image signals produced from an output signal from an image sensor for capturing the object image.

13. A focus control apparatus comprising circuitry which function as:
    a focus detection apparatus; and
    a controller configured to control driving of a focus lens depending on focus detection information acquired by the focus detection apparatus,
    wherein the focus detection apparatus comprises:
      a producer configured (a) to acquire paired phase difference image signals that are produced through photoelectric conversion of an object image formed by an optical system including the focus lens and that have therebetween a phase difference corresponding to a focus state of the object image, and (b) to produce focus detection information using the phase difference acquired from the paired phase difference image signals;
an acquirer configured to acquire a feature value relating to a correlation value between the paired phase difference image signals; and
a determiner configured to determine whether or not multiple phase differences usable for producing the focus detection information are acquired from the paired phase difference image signals,
wherein the producer is configured to acquire the phase difference depending on a result of comparison between the feature values acquired before and after driving of the focus lens, and
wherein the producer is configured to select, when the multiple phase differences are acquired, depending on the result of the comparison between the feature values acquired before and after driving of the focus lens, a focus detection phase difference from one of the multiple phase differences and to be used for producing the focus detection information.

14. An image-capturing apparatus comprising:
an image sensor configured to capture an object image; and
a focus control apparatus,
wherein the focus control apparatus comprises circuitry which function as:
a focus detection apparatus; and
a controller configured to control driving of a focus lens depending on focus detection information acquired by the focus detection apparatus,
wherein the focus detection apparatus comprises:
a producer configured (a) to acquire paired phase difference image signals that are produced through photoelectric conversion of an object image formed by an optical system including the focus lens and that have therebetween a phase difference corresponding to a focus state of the object image, and (b) to produce focus detection information using the phase difference acquired from the paired phase difference image signals;
an acquirer configured to acquire a feature value relating to a correlation value between the paired phase difference image signals; and
a determiner configured to determine whether or not multiple phase differences usable for producing the focus detection information are acquired from the paired phase difference image signals,
wherein the producer is configured to acquire the phase difference depending on a result of comparison between the feature values acquired before and after driving of the focus lens, and
wherein the producer is configured to select, when the multiple phase differences are acquired, depending on the result of the comparison between the feature values acquired before and after driving of the focus lens, a focus detection phase difference that is one of the multiple phase differences and is used for producing the focus detection information.

15. A focus detection method comprising the steps of:
acquiring paired phase difference image signals that are produced through photoelectric conversion of an object image formed by an optical system including the focus lens and that have therebetween a phase difference corresponding to a focus state of the object image;
producing focus detection information using the phase difference acquired from the paired phase difference image signals;
acquiring a feature value relating to a correlation value between the paired phase difference image signals; and
determining whether or not multiple phase differences usable for producing the focus detection information are acquired from the paired phase difference image signal,
wherein the method acquires the phase difference depending on a result of comparison between the feature values acquired before and after driving of the focus lens, and
wherein the method selects, when the multiple phase differences are acquired, depending on the result of the comparison between the feature values acquired before and after driving of the focus lens, a focus detection phase difference from one of the multiple phase differences to be used for producing the focus detection information.

16. A non-transitory computer-readable storage medium for storing a computer program to cause a computer to execute a focus detection process,
the focus detection process comprising:
acquiring paired phase difference image signals that are produced through photoelectric conversion of an object image formed by an optical system including the focus lens and that have therebetween a phase difference corresponding to a focus state of the object image;
producing focus detection information using the phase difference acquired from the paired phase difference image signals;
acquiring a feature value relating to a correlation value between the paired phase difference image signals; and
determining whether or not multiple phase differences usable for producing the focus detection information are acquired from the paired phase difference image signal,
wherein the process acquires the phase difference depending on a result of comparison between the feature values acquired before and after driving of the focus lens, and
wherein the process selects, when the multiple phase differences are acquired, depending on the result of the comparison between the feature values acquired before and after driving of the focus lens, a focus detection phase difference from one of the multiple phase differences to be used for producing the focus detection information.

* * * * *